United States Patent [19]

Ghoneimy et al.

[11] Patent Number: 5,524,241
[45] Date of Patent: Jun. 4, 1996

[54] SYSTEM AND METHOD FOR EXECUTING, TRACKING AND RECOVERING LONG RUNNING COMPUTATIONS

[75] Inventors: Adel Ghoneimy, San Jose; Meichun Hsu, Los Altos Hills; Karl Kleissner, Los Gatos, all of Calif.

[73] Assignee: Digital Equipment Corporation, Maynard, Mass.

[21] Appl. No.: 426,415

[22] Filed: Apr. 18, 1995

Related U.S. Application Data

[63] Continuation of Ser. No. 831,114, Feb. 4, 1992, abandoned.
[51] Int. Cl.$^6$ ....................................... G06F 11/34
[52] U.S. Cl. ............... 395/600; 395/182.13; 395/182.18; 364/282.4; 364/285.2
[58] Field of Search .............................. 395/600, 182.13, 395/182.18

[56] References Cited

U.S. PATENT DOCUMENTS

| | | | |
|---|---|---|---|
| 4,425,630 | 1/1984 | Yomogida et al. | 395/144 |
| 4,815,028 | 3/1989 | Saitoh | 395/575 |
| 4,868,744 | 9/1989 | Reinsch et al. | 395/575 |
| 4,912,628 | 3/1990 | Briggs | 395/650 |

FOREIGN PATENT DOCUMENTS

| | | | |
|---|---|---|---|
| 0516900 | 9/1992 | European Pat. Off. | G06F 11/14 |

*Primary Examiner*—Krisna Lim
*Attorney, Agent, or Firm*—Gary E. Ross; Arthur W. Fisher

[57] ABSTRACT

A transaction description database represents long running computations as a flow or set of computational steps with data arcs therebetween. The description database defines each step's input and output signals, input condition criteria for creating an instance of the step, an application program associated with the step, and criteria for selecting a resource to execute the step. A flow controller controls the process of executing instances of each defined type of long running transaction. Execution of a long running transaction begins when a corresponding set of externally generated input event signals are received by the flow controller. During execution of a long running transaction, each step of the transaction is instantiated only when a sufficient set of input signals is received to execute that step. At that point an instance of the required type of step is created and then executed by a selected resource. After termination of a step, output signals from the step are converted into input event signals for other steps in the long running transaction in accordance with data stored in the transaction description database. Each step executes an application program and is treated as an individual computation insofar as durable storage of its computational results. Log records are durably stored upon instantiation, execution and termination of each step of a long running transaction, and output event signals are also logged, thereby durably storing sufficient data to recover a long running transaction with virtually no loss of the work that was accomplished prior to a system failure.

15 Claims, 13 Drawing Sheets

Instantiation Condition For Stp71 =
C1{P and Q} OR C2{Q and R}

| Step Type ID | 361-1 | 361-2 | 361-3 | 361-4 | |
|---|---|---|---|---|---|
| Step Type ID | Stp71 | Stp71 | Stp71 | Stp71 | 362 |
| Condition ID | C1 | C1 | C2 | C2 | 364 |
| Port ID | P | Q | Q | R | 366 |
| Flag (Sufficient For Instantiation) | No | Yes | No | Yes | 368 |
| Position (In FIE Queue) | 1 | 2 | 1 | 2 | 370 |

SYSTEM AND METHOD FOR EXECUTING, TRACKING AND RECOVERING LONG RUNNING COMPUTATIONS

This application is a continuation of application Ser. No. 07/831,114, filed Feb. 4, 1992, now abandoned.

The present invention relates generally to transaction processing by distributed computer systems and particularly to systems and methods for handling long running transactions and other types of long running computations. The present invention is also related to computerized work flow management and processing tasks that require cooperative participation by multiple principals.

BACKGROUND OF THE INVENTION

In the field of transaction processing, transactions are typically short lived computations that have a well defined beginning and end. Various protocols have been invented to ensure that all the participants in a transaction agree on how to terminate the transaction, most being based on the so-called two phase commit (2PC) protocol.

For instance, multiple computers and multiple processes may participate in the computation initiated when a clerk or travel agent enters an airline reservation into an airline reservation system. After all the necessary data records in the distributed airline reservation system have been created or updated and all the associated computations and input/output operations have been completed, the transaction terminates using a "commit" protocol that ensures that all the transaction's participants (i.e., the various computer processes working on the transaction) agree that the transaction has been successfully completed and can be permanently stored. A similar set of events occurs when a bank teller enters a deposit or withdrawal at the teller's workstation. The duration of such transactions is typically very short, meaning a duration on the order of seconds, and possibly much shorter than a second.

This document is concerned with transactions and computations that have long durations. An example of such a computation is one which collects data from a large number of sources, and then integrates that data in some way. The data collection process involves numerous interactions with various pieces of hardware, and the duration of the computation may be extended, depending on the availability of all the required participating computers and other pieces of hardware. Another example of a long running computation might be the ongoing control process for forming various batches of parts in a steel mill. If the process of handling each batch of parts is considered to be a single computation, the duration of that computation will be dictated by the duration of the steel mill's physical processing steps.

In all transaction processing systems, for both short and long lived computations, an important consideration is recovering from system failures. It is essential in all modern transaction processing systems to be able to automatically recover from virtually any system failure once the system is brought back on line. This means that the system must store sufficient data to determine what its state was just prior to the system failure, and to re-initiate processing of all interrupted transactions with as little backtracking as possible.

Typically, in most transaction processing systems, system recovery is implemented by restarting all interrupted transactions at those transactions' beginning. Log records are stored at the beginning and end of each such transaction, enabling a system failure recovery routine to determine which transactions have been completed and which were in mid-process when a system failure occurred. This solution is not suitable for systems handling long running computations, since that recovery method would mean the redoing of much valuable work. An additional problem that distinguishes long running and short lived transactions is the problem of keeping sufficient records concerning the status of each transaction. For short lived transactions, it is generally sufficient to generate and store log records (A) marking the beginning of each transaction and recording sufficient data to restart that transaction, (B) recording changes made to various data structures so that those changes can be reversed if necessary, and (C) marking the conclusion of the transaction once the results of the transaction have been permanently stored. For long running transactions, backing up the system to undo all the work performed by the transaction up to the point of a system failure will typically be much more involved and in some cases may be virtually impossible.

Another problem associated with long lived transactions concerns the use of data interlock mechanisms. In order to prevent two different transactions or computations from accessing and making inconsistent changes to a record in a database or to any other specified object, most multitasking computer systems provide interlock mechanisms that allow one transaction to have exclusive use of a specified object until the transaction either completes or explicitly releases its lock on the object. In most cases, a transaction maintains a lock on each object used by the transaction until either the transaction commits and its results are permanently stored, or the transaction aborts and any interim changes are reversed. The problem associated with long lived transactions is that locking the objects used by each transaction for a long period of time can result in system deadlock, where many transactions are unable to proceed because other long lived transactions have locks on objects needed by the blocked transactions. Clearly, the extent of the deadlock problem is related to the average number of objects used by each transaction and the average amount of overlap between transactions as to the objects used by those transactions. Nevertheless, the time duration of long lived transactions greatly increases the chances that transactions competing for resources will be delayed for significant periods of time.

One additional problem associated with long lived transactions that is not a problem with short lived transactions concerns tracking those transactions. For short lived transactions, it is generally sufficient to know that each transaction is either in process, in process but blocked from proceeding because a required resource is not available, aborted, or completed. However, for long lived transactions it is important to monitor the status of each transaction at a much greater level of detail.

In summary, problems that distinguish long lived transactions from short lived transactions are recovering interrupted transactions, deadlocks caused by data interlocks, and the need to be able to track or monitor the status of transactions that are in process.

SUMMARY OF THE INVENTION

In summary, the present invention is a system and method for executing and tracking the progress of long running computations, and for recovering from system failures during the execution of long running computations. Each type of long running computation that will be used in a particular system is represented in a flow description database as a flow i.e., a set of computational steps with data arcs therebetween. Each step executes an application program and is treated as an individual computation insofar as durable storage of its computational results. Data flows between the steps are represented in the description database as data paths between the steps.

A flow controller controls the process of executing instances of each defined type of long running transaction. Execution of a long running transaction begins when a corresponding set of externally generated input event signals are received by the flow controller. During execution of a long running transaction, each step of the transaction is instantiated only when a sufficient set of input event signals is received to execute that step. At that point an instance of the required type of step is created and executed. After termination of a step, output signals from the step are converted into input event signals for other steps in the long running transaction in accordance with "arc" data stored in the transaction description database.

In addition, log records are durably stored upon instantiation, execution and termination of each step of a long running transaction, and output event signals are also logged, thereby durably storing sufficient data to recover a long running transaction with virtually no loss of the work that was accomplished prior to a system failure.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
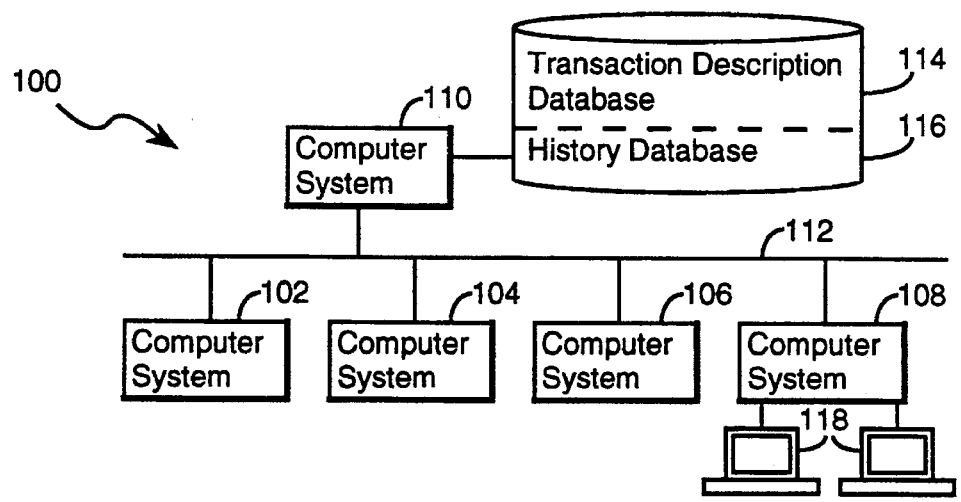
FIG. 1 is a block diagram of a distributed computer system used to perform long running transactions.

Referring to FIG. 1, the preferred embodiment of the present invention is a transaction processing system and method that typically operates in the context of a distributed computer system 100 having a set of computers 102–110 interconnected by a local or wide area network 112 or some other communications medium. Each of these computers 102–110 is said to be located at a distinct node of the distributed computer system 100.

Each computer 102–110 contains standard computer system components, including a data processing unit, system bus, random access memory RAM, read only memory (ROM), mass storage (e.g., magnetic or optical disks), a user interface (e.g., keyboard, monitor and printer) and communications ports. These physical computer components (not shown) are not modified by the present invention and are therefore not described in detail herein.

At least one of the networked computers 110 is responsible for maintaining a transaction description database 114, and the same computer or another one in the system maintains a transaction history database 116. As will be described in detail below, the transaction description database 114 stores data representing each type of long term transaction that has been defined for the system. The history database 116 is essentially a log record database that can be inspected to determine the status of any ongoing long term transaction and to reconstruct ongoing transactions when recovering from a system failure.

Flow Management System Components

Figure 2:
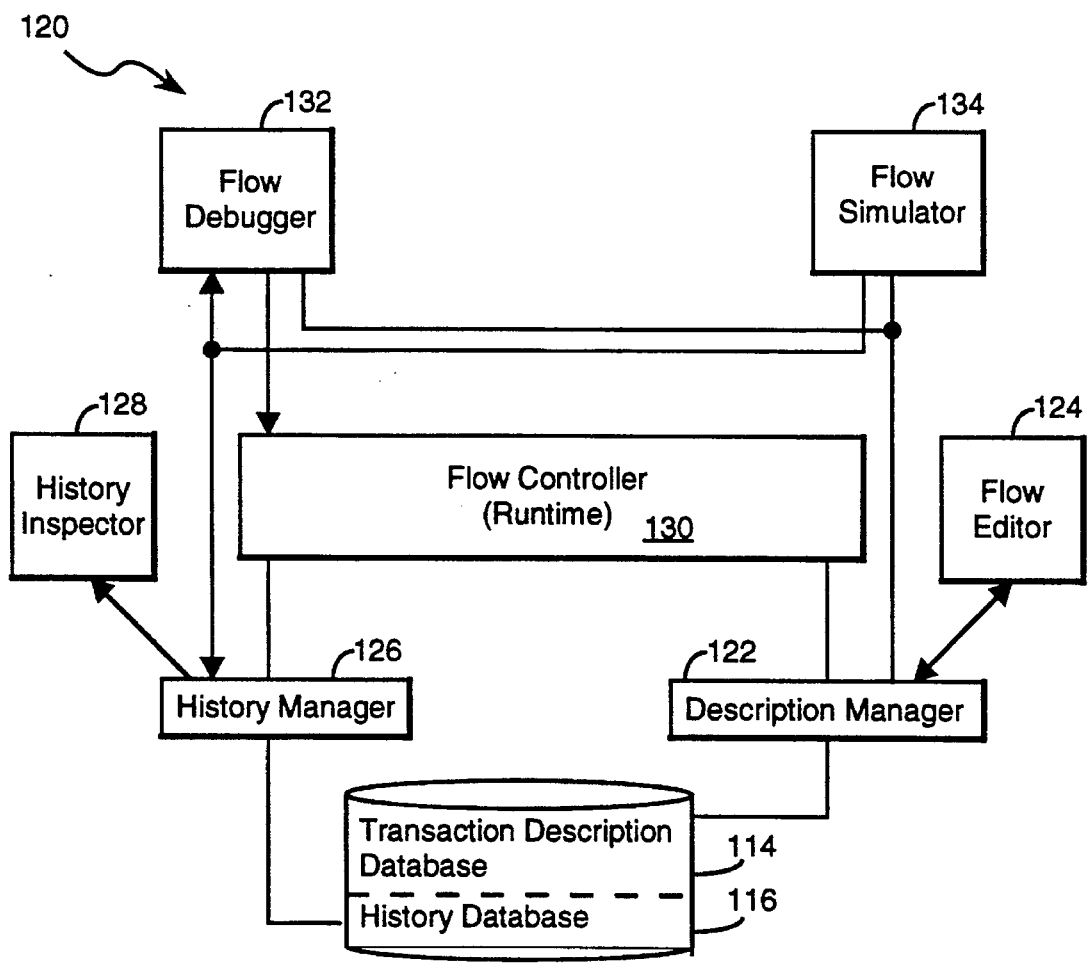
FIG. 2 is a block diagram of the primary software components of a long running transaction processing system.

Referring to FIG. 2, the preferred embodiment of the invention uses a flow management system 120, consisting of a set of software modules, to control the execution of long running transactions. A description manager module 122 is responsible for storing data representing each type of transaction in the transaction description database 114. The description manager module 122 and the structure of the transaction description database 114 will be described in detail below with reference to FIGS. 3–5.

In the preferred embodiment, a flow editor module 124 provides a graphic interface to facilitate the process of defining long running transactions. However, standard database editing tools can be used to define long running transactions in accordance with the present invention.

A history manager module 126 is responsible for storing log records generated during the execution of long running transactions. The log records are defined and stored so that it is possible to determine the status of each step of each executing long running transaction. In fact, the log records used in the preferred embodiment allow one to determine the exact point of execution of each step of a long running transaction and are sufficient to allow restarting each such step at various mid-step stages in the case of a system failure and recovery. A history inspector module 128 provides a user interface for checking on the status of executing long running transactions. The log records also allow review of completed transactions. The format of the log records used in the preferred embodiment, and linkages between log records used to help determine the current status of each long running transaction is discussed below with reference to FIGS. 19–21 in the section entitled "Log Record Database and System Failure Recovery".

A flow controller 130 is the main engine of the preferred embodiment. It controls the execution of each long running transaction, including the creation of new instances of predefined long term transactions, handling data flows between steps of the transactions, durably storing the results of each transaction step, creating log records used for system crash recovery and status monitoring, and so on. The flow controller 130 and its underlying data structures are discussed extensively below.

A flow debugger 132 and flow simulator 134 are software modules used during the process of defining long term transactions to assist the programmer while checking and debugging the defined transactions.

Components of a Long Running Transaction

Figure 3:
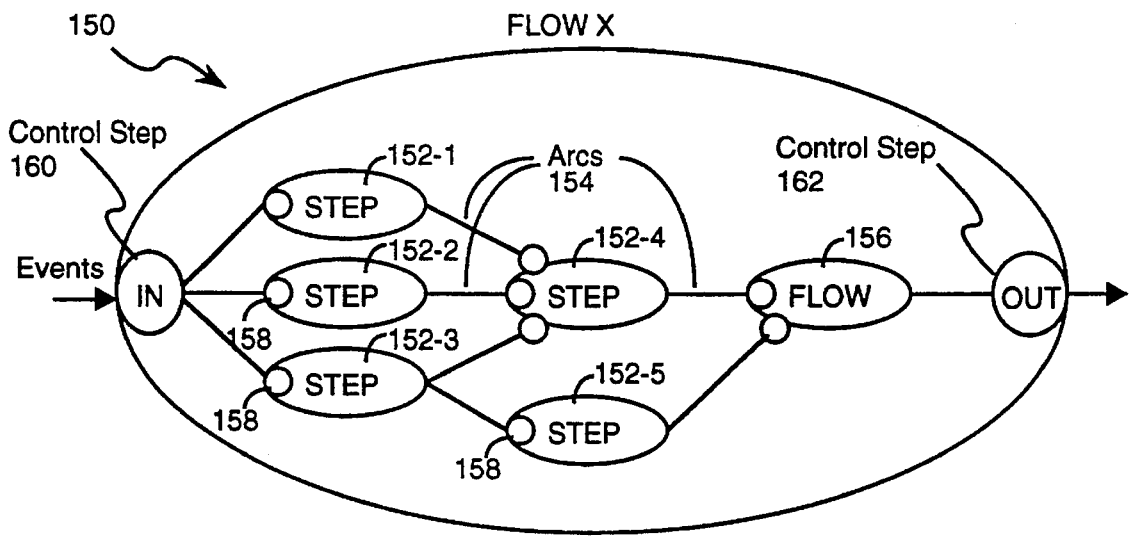
FIG. 3 schematically depicts a computational flow.

Referring to FIG. 3, each type of long running transaction is modelled as a "flow" 150. A flow 150 comprises a set of computational steps 152 interconnected by data signal paths 154 called arcs. A flow 150 can contain sub-flows 156, which means that flows can be nested. Each step 152 has input ports 158 and usually has at least one output port. Furthermore, the flow 150 has special input and output control steps 160 and 162 for mapping input events and output events between the flow 150 and the external world.

While the set of arcs 154 shown in FIG. 3 are very simple, it should be understood that the data path linkages between steps in some circumstances may be very complex and may even include loops or feedback paths for situations in which a set of steps may be reiterated under specified conditions (see discussion below of input and output conditions).

When defining any long term transaction using the preferred embodiment, there is a fair amount of latitude as to how much of the transaction should be included in each step 152. This is a matter of programming choice on the pad of the person defining the long term transaction. The general criteria are that the computation performed by each step (1) should perform a unit of work that is useful and worth saving should the overall transaction fail mid-stream, and (2) should be sufficiently shod in duration that it does not tie up system resources for an extended period of time. There must also be clear criteria for when each step 152 or subflow 156 is ready to begin execution, what inputs it needs and where those inputs come from, and where its outputs should be sent.

As shown in FIG. 3, a long running transaction can include parallel computational paths. It is beneficial to define long running transactions with parallel paths whenever steps do not need to be performed sequentially because the parallel paths may be executed simultaneously if there are sufficient system resources (e.g., processors) available. This makes efficient use of the system's resources and also may reduce the amount of time required to complete a transaction.

Figure 4:
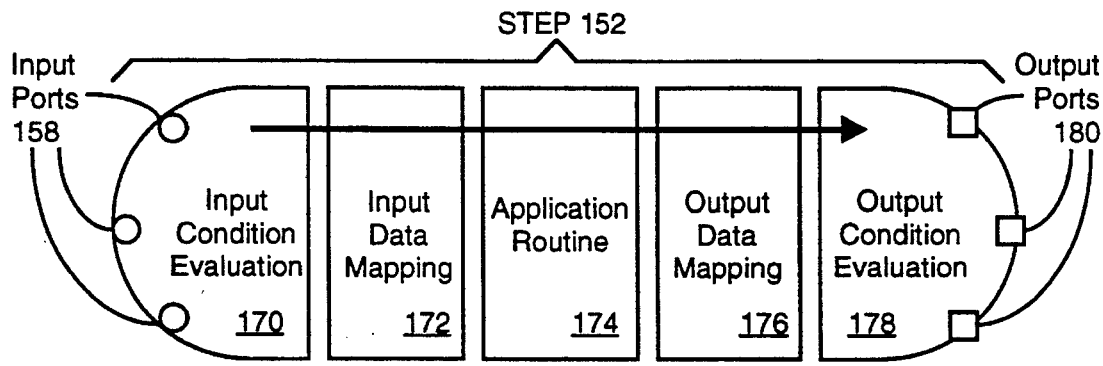
FIG. 4 is a block diagram of the computation components of a signal computational step.

Referring to FIG. 4, each step 152 in a flow is modelled in the preferred embodiment as having several components, each of which performs a substep associated with the execution of that step. Input condition evaluation module 170 determines when enough input events have been received to require that an instance of the step 152 be created and executed. Input data mapping module 172 maps data received from input events into the order required for executing a specified application routine 174. Application routine 174 is the actual computation routine that is performed by the step. The routine 174 can be complex or simple, as defined by the programmer setting up the transaction. Output data mapping module 176 maps output values from the application routine 174 into a specified order, and output condition evaluation module 178 issues output event messages through one or more output ports 180.

Transaction Description Database

Figure 5:
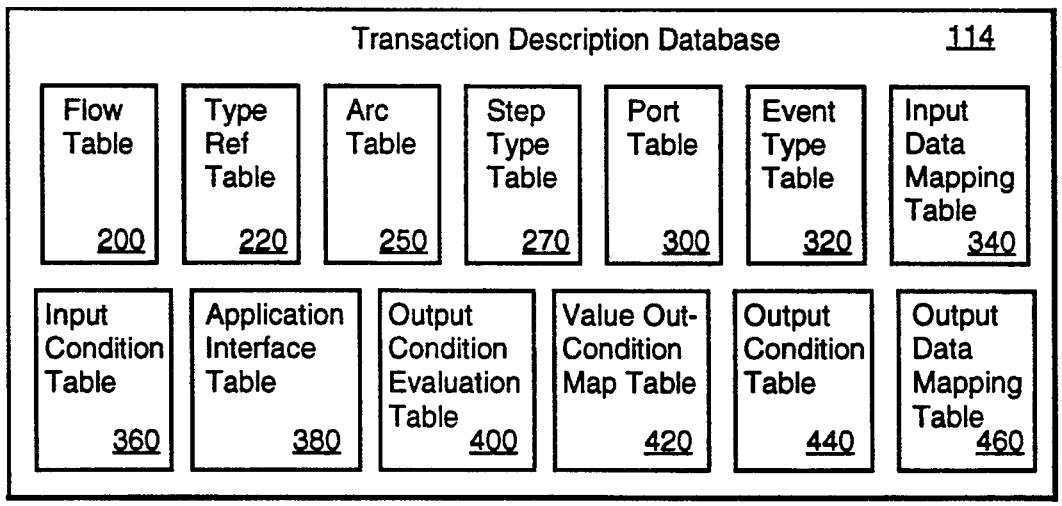
FIG. 5 is a block diagram of the primary tables used in a transaction description database.

Referring to FIGS. 2 and 5, a "model" of each type of long running transaction defined for a particular distributed computer system is stored in the form of a set of tables, herein called the transaction description database 114. In other words, all the relationships between the steps 152 of a transaction, as well as all other information needed to define and execute the long running transaction are stored in the form of a set of flat database tables.

To understand the following description, it is important to distinguish between a "Flow Type" and an instance of that Flow Type. A Flow Type represents a type of long running transaction that may be performed many times. Each time that Flow Type is invoked, an instance of that Flow Type is generated in the distributed computer system and it is the performance of that flow instance which is tracked. Similarly, a Step Type is a model of a particular computational step, while a step instance represents one computational step of that Step Type in a flow.

Figure 6:
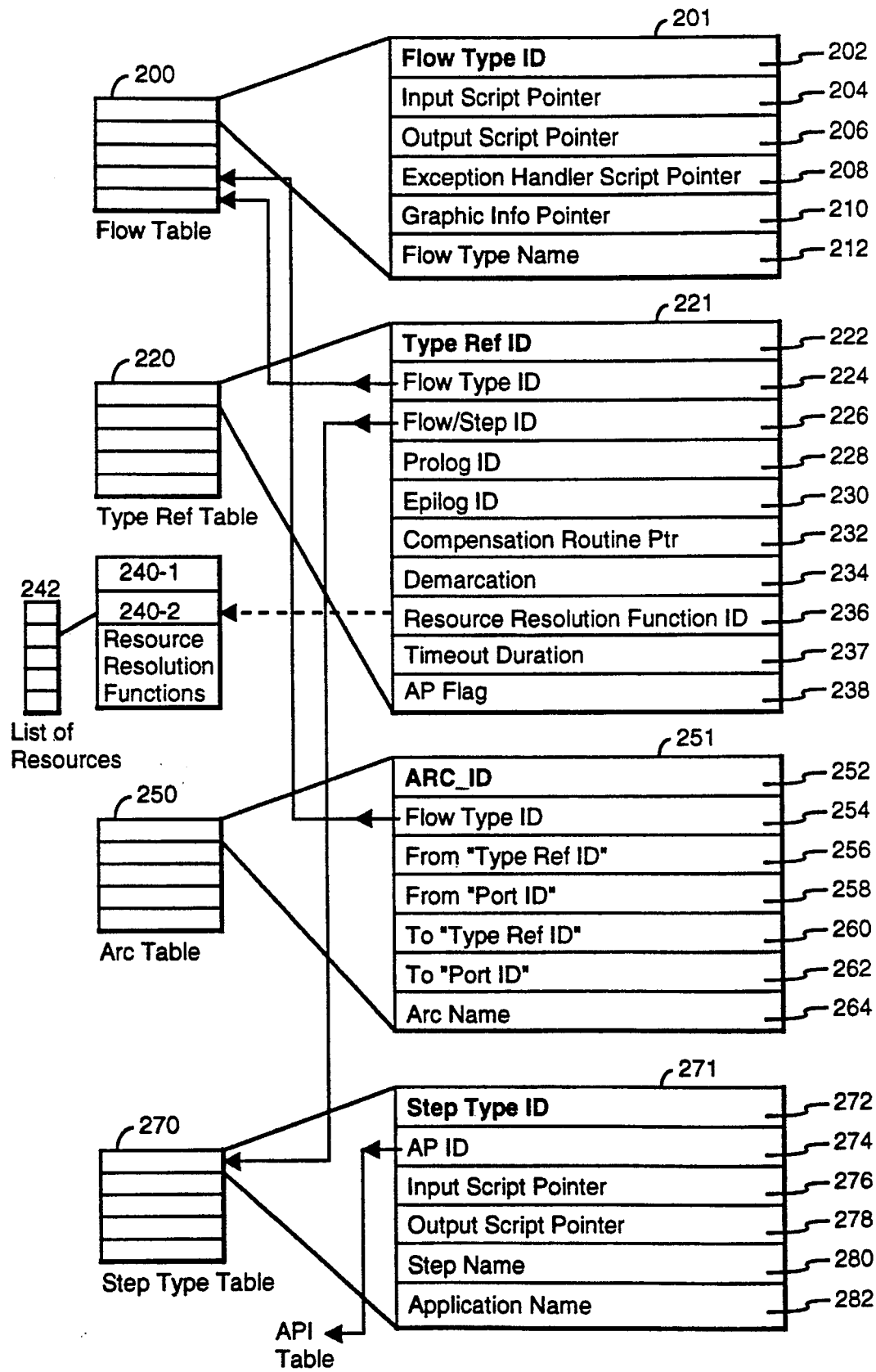
FIGS. 6 and 7 depicts some of the data structures of records in the tables in a transaction description database.

Flow Table. Referring to FIG. 6, the flow table 200 contains one record 201 for each defined Flow Type. The flow table records each contain a Flow Type ID 202 that is a unique value assigned to each Flow Type, an input script pointer 204 that points to a text string regarding inputs to flows of this Flow Type, an output script pointer 206, an exception handler script pointer 208, a graphic information pointer 210 that points to a file of graphic information used when displaying a representation of the flow, and a Flow Type Name 212 that is a text string containing the name of the flow as shown to system users and programmers. The script pointers 204, 206 and 208 all point to records in a "script" table, each record of which contains a text string containing descriptive text.

Type Ref Table. The Type Ref Table 220 contains a record 221 for every step and flow element in each Flow Type. The Type Ref records each contain a Type Ref ID 222 that is a unique value assigned to each flow and step element if the defined Flow Types, a Flow Type ID 224, which is a pointer (sometimes called a foreign key) to a corresponding record in the flow table 200 for this flow, a flow/step ID 226 that points to a record in the Step Type table corresponding to a particular step, a Prolog ID 228, and Epilog ID 230, a compensation routine pointer 232, a demarcation value 234, a Resource Resoluion function ID 236, Timeout Duration 237, and an application flag 238. The Demarcation value 234 indicates whether a step is at the beginning, end or intermediate position within a flow.

The compensation routine pointer 232 references a "compensation routine" that can be called when an exception (such as a timeout) occurs during the execution of a step or flow. Thus, each type of step can have a customized compensation procedure. Typically, when any step in a flow fails to execute, resulting in a decision to abandon the long running transaction, the compensation routine for the step that failed is executed, and then the compensation routines for all of steps of the flow that were previously executed are run, but in the reverse order of the steps. The chain of steps already executed in the flow is determined from the Log records maintained by the system, as will be described later. Compensation routines are thus used to "clean up" after a long running transaction or flow is aborted. In the preferred embodiment, the use of the compensation routines is not automatic, but is made by a human system operator (e.g., after the operator tries, but fails, to restart execution of the long running transaction).

The Resource Resolution Function ID 236 points, directly or indirectly, to a software routine called a Resource Resolution Function 240 that selects a "resource"(i.e., computer or other agent, such as a selected person) to execute the step. Resources are sometimes herein called "principals". Each time that a step is instantiated, the flow controller calls the specified Resource Resolution Function to select one resource or principal from a list 242 of defined resources to execute the step instance. Thus the resource to be used to execute each instantiated step is dynamically selected at the time of execution. The system may include many resource resolution functions, each using different criteria for selecting the resource to be used to execute a particular instance. In some cases, the resource will be selected to be the same resource previously selected to execute an earlier step in the long running computation. Other criteria for selecting a resource may include the role played by the step, the "client" or "customer" for which a job is being performed, the history of the transaction up to this point, and so on.

The Timeout Duration 237 value indicates the maximum amount of time that should be allocated for execution of the associated flow or step.

The AP Flag 238 is true if the step associated with the record 221 executes an application program and is false if the step is just a control step that does not execute an application program.

It should be noted that FIGS. 6, 7, 8 and 9 represent the schemas of the primary tables used in the transaction description database to represent each defined type of long running transaction.

Arc Table. The Arc Table 250 contains records 251 that provide information for each data path within a flow. Each record has a unique ARC ID 252 for each arc in the Flow Type, a Flow Type ID 254 indicating the Flow Type in which the arc is found, a "From Type Ref ID" 256 and "From Port ID" 258 that specify the type of component and port from which data signals are received by the arc, and a "To Type Ref ID" 260 and "To Port ID" 262 that specify the type of component and port to which the data signals are sent. Arc Name 264 is a label or text string name given to the arc, typically having a value such as "Flow_X_Arc_21".

Step Type Table. The Step Type Table 270 contains one record 271 for each step in each of the defined Flow Types. The Step Type table record 271 is assigned a unique Step Type ID 272, an Application ID 274 that identifies the application program, if any, executed by this step, Input and Output Script Pointers 276 and 278, a Step Name 280 that is a text string name given to the step, and an Application Name 282 that is a text string identifying the name of the application program executed by this step, if any.

Figure 7:
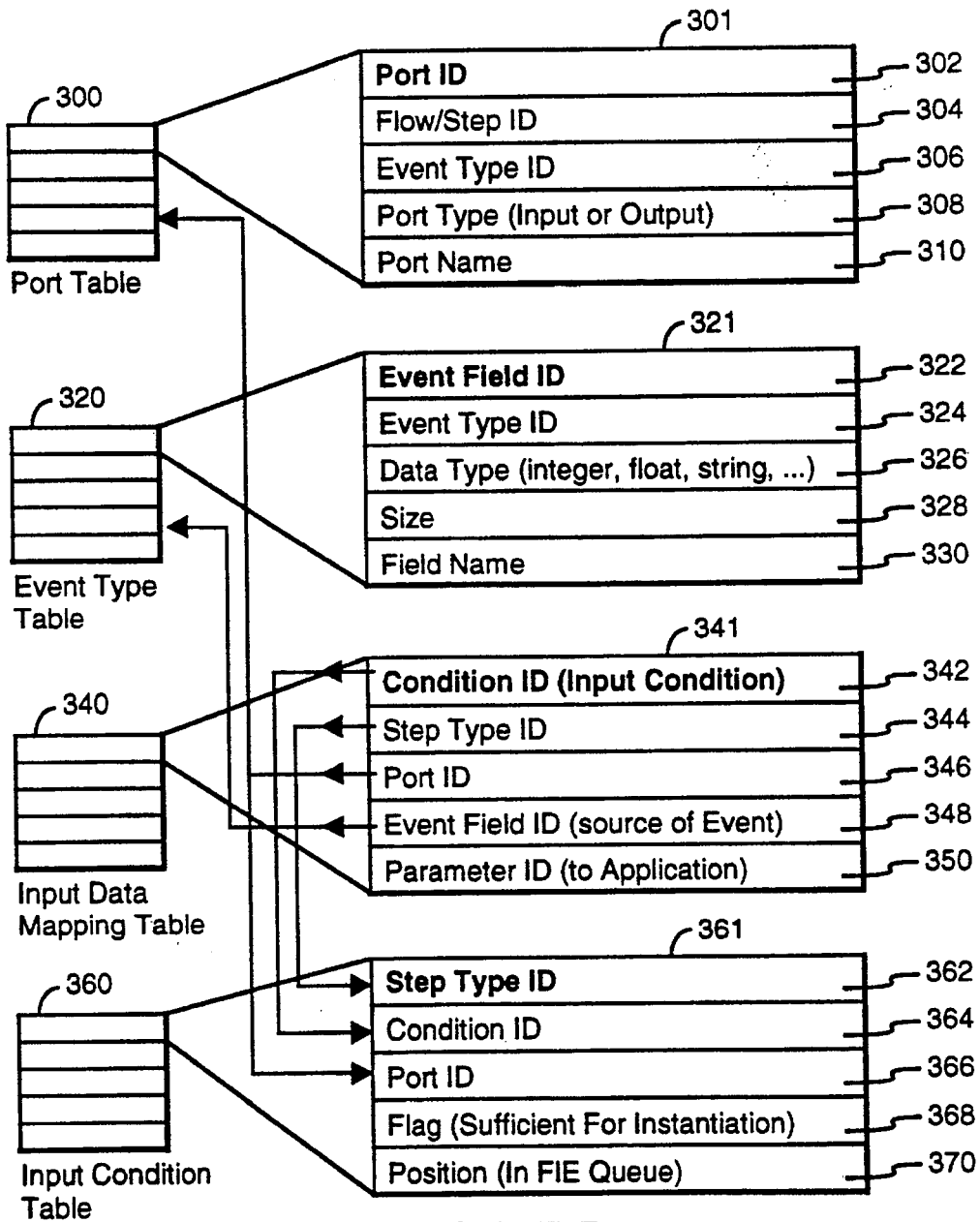

Port Table. Referring to FIG. 7, the Port Table 300 defines each of the input and output ports for each step in each defined flow. A Port Table record 301 for one port has a unique Port ID 302, a Flow/Step ID 304 that identifies the Flow or Step for which a port is being defined, an Event Type ID 306 that references a record 321 in the Event Type Table 320 (discussed below), a Port Type 308 that defines whether the port is an input or output port, and a Port Name 310 that is a text string name given to the port, such as "Output Port A" or "Q1".

Input Conditions and Input Data Mapping

Conceptually, an "event" is the occurrence of something that generates a data signal. For the purposes of this document, an event signal (often called "an event") is a data signal representing an event.

The purpose of an input condition is to specify one or more sets of input event signals that are sufficient to initiate execution of each type of computational step defined in the transaction description database. A particular flow or Step Type may have multiple input conditions, each specifying a different combination of input event signals. When the flow controller receives input event signals that match any input condition for a particular Step Type, an instance of that step is created and scheduled for execution. The process of creating a step instance is called "instantiation" or "instantiating a step".

The purpose of the Port, Event Type, Input Data Mapping, Input Condition and API tables 300, 320, 340, 360 and 380 is to provide a flexible mechanism for defining input conditions for each Step Type and also for mapping data contained in event signals into the parameters needed by the application program executed by each Step Type.

Event Type Table. Each type of event has an associated format or template for the data conveyed by the event, and the Event Type Table 320 defines the format of each type of event signal. Each event type record 321 defines one data field of an event signal and has a unique Event Field ID 322 as well as an Event Type ID 324 that identifies the type of event for which a field is being defined. For instance, an event signal with two data fields would have two records in the Event Type Table 320. The record 321 also has a Data Type value 326, indicating whether the data in this field is an integer, floating point number, string, and so on. The Size 328 indicates the amount of storage occupied by the field, and Field Name 330 is a text string of the name of the field.

Input Data Mapping Table. The purpose of the Input Data Mapping Table 340 is to specify what input event signals are to be mapped into each of the parameters needed by a step's application program. Each record 341 of the table 340 represents one input event that can be received by a particular step, and includes a Condition ID 342, which is discussed below, a Step Type ID 344 that identifies the step that receives the event signal, a Port ID 346 that identifies the Port at which the event signal is received, an Event Field ID 348 that defines the format of the event signal by referencing one of the records in the Event Type Table 320, and a Parameter ID 350 that identifies the parameter in the application program whose value is to be provided by the event signal.

Input Condition Table. The Input Condition Table 360 specifies when the right combination of event signals has been received to initiate computation of a step in a long running transaction. As explained above, for any one step it is possible to have two or more input conditions. Each input condition is the logical conjunction of one or more input ports, meaning that the input condition is satisfied when event signals are received on all of the ports specified by that input condition. Satisfying any one input condition is sufficient for instantiating the step.

The Input Condition Table 360 has a set of records for each input condition of each step. Each record 361 contains the Step ID 362 of the step to which it pertains, a Condition ID 364 that identifies a particular input condition, a Port ID 366 that identifies the port on which an event signal may be received, a Flag value 368 and a Position value 370. The records in the Input Condition Table are ordered so that all the records 361 for one Step ID are clustered together, with all the records for each input condition of the step clustered together and ordered so that the Position value 370 increases in value within the cluster of records for each input condition. The Flag value 368 is equal to "Yes" only for records corresponding to the last input event signal for a particular input condition, and otherwise is equal to "No". Thus Flag 368 is equal to "Yes" only when the corresponding set of input signals is necessary and sufficient for instantiation.

Figure 8:
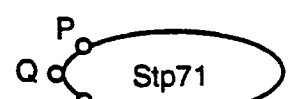
FIG. 8 is a block diagram of a set of input condition table entries representing alternate input conditions for instantiating a particular computational step.
Figure 9:
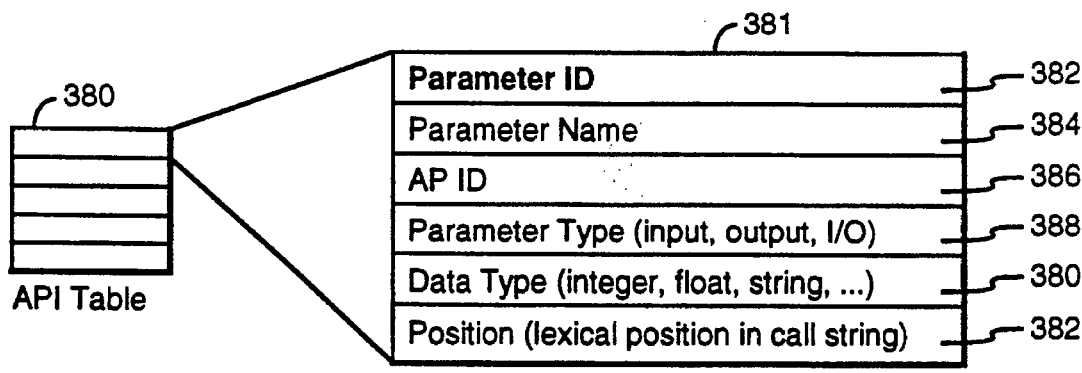
FIG. 9 depicts the data structure of an application parameter identification table in the transaction description database of the preferred embodiment.

Referring to FIG. 8, the use of the Input Condition Table 360 is most easily explained by example. Consider a step Stp71 having three input ports P, Q and R and two input conditions C1 and C2. Input condition C1 is "P and Q" and input condition C2 is "Q and R". This means that if event signals are received on ports P and Q, or on ports Q and R, the step Stp71 will be instantiated. As will be explained below, all event signals in the distributed computer system are stored in a queue called the FIE (flow input event) queue. The events in that queue are sorted by the Step ID for the step to which the event signal is being sent, and then by input Port ID. The Flag 368 and Position 370 values are simply a convenient method of keeping track of the number of input event signals that must be received to satisfy each input condition.

API Table. The purpose of the API (application parameter input) Table 380 is to define each of the input and output parameters associated with an application program. Each row 381 of the table 380 defines one parameter for one application program. The components of each row 381 are a unique parameter ID 382 and parameter name 384 for the parameter being defined, the Application ID 386 for the application program associated with the defined parameter, a parameter type 388 (i.e., input, output, or input/output), a data type specifier 390 indicating whether the parameter is an integer, floating point numbers, and so on, and a position value 392 indicating the position of the parameter in the call string for the application program.

Output Condition Evaluation and Output Data Mapping

The basic concept concerning output data mapping is as follows. While many steps (i.e., application programs) will output the same set of event signals (e.g., event signals on output ports Q1 and Q2) every time they are run, for some steps it is important to be able to generate different sets of output event signals depending on some control parameter. Each distinct value of the control parameter is called an output condition, and a corresponding specified set of output event signals is generated.

Figure 10:
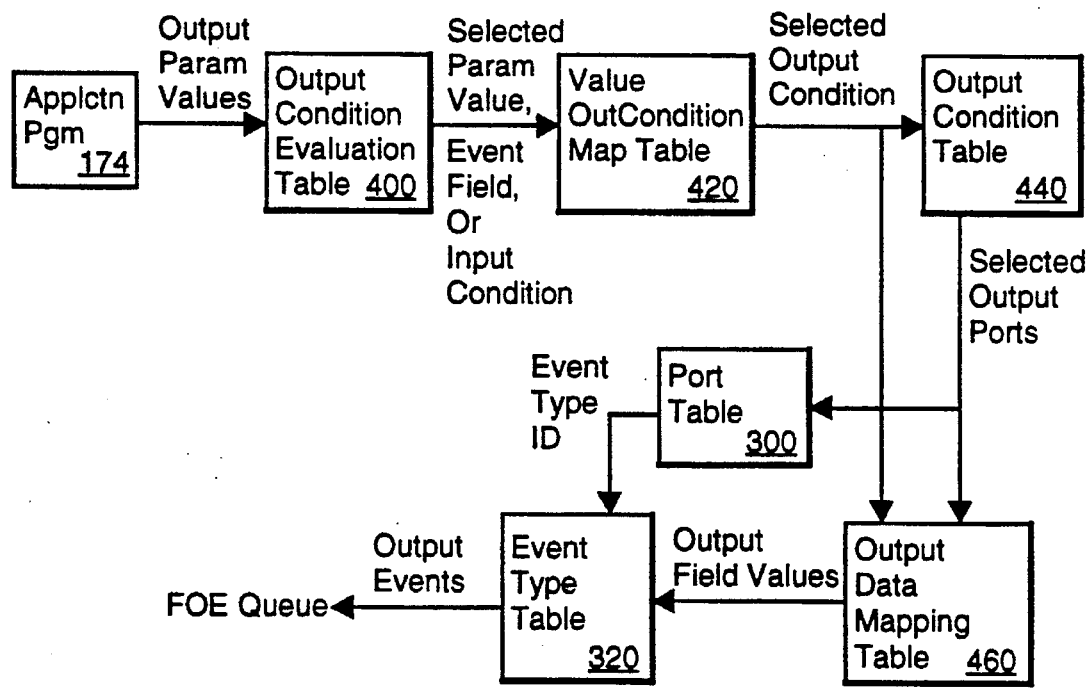
FIG. 10 is a flow diagram of the process for mapping output parameters generated by an application program into a set of output event signals.
Figure 11:
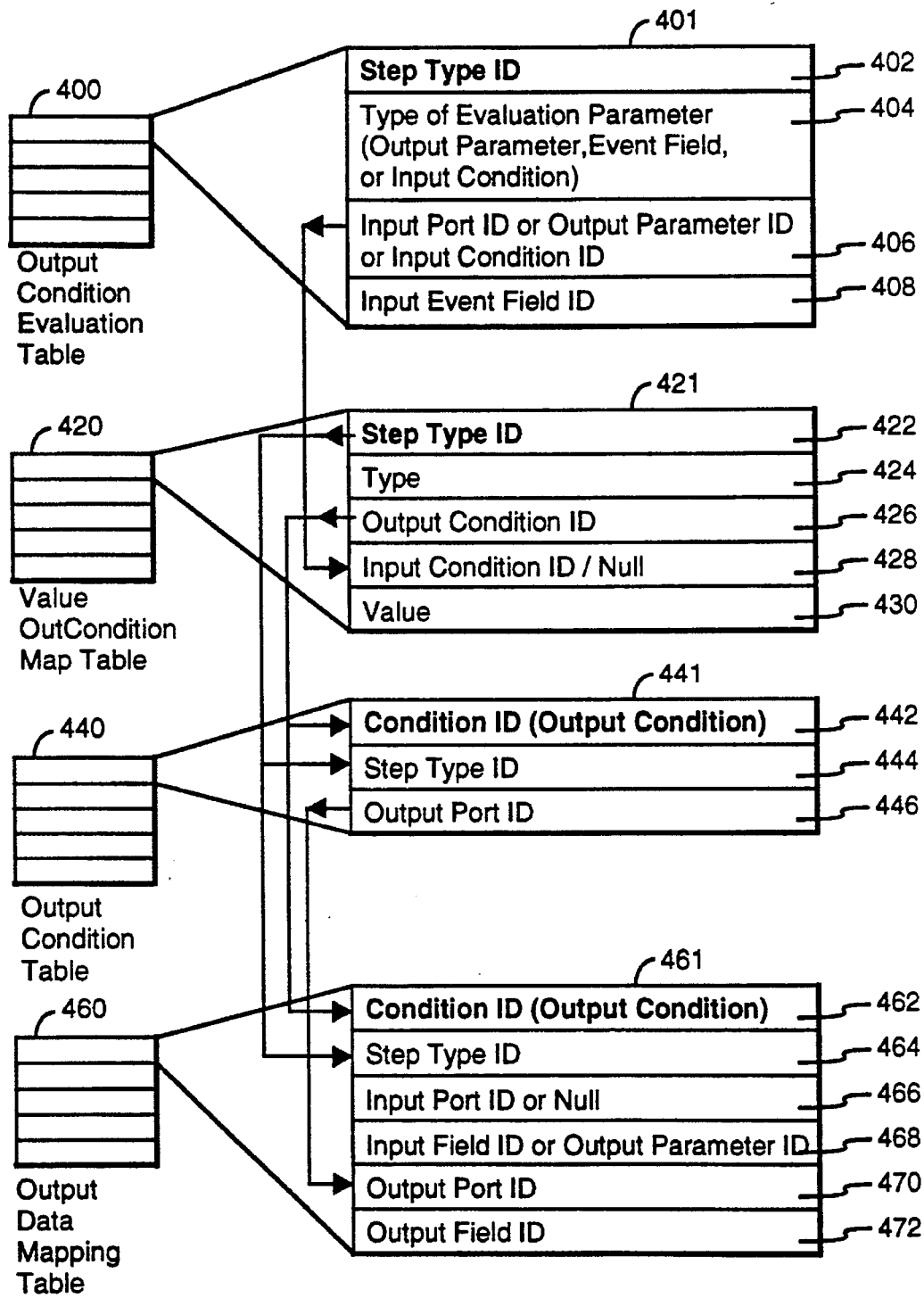
FIG. 11 depicts the data structures of tables in the transaction description database of the preferred embodiment used for mapping output parameters.

Referring to FIGS. 10 and 11, in the preferred embodiment, an Output Condition Evaluation Table 400 specifies for each program what the control parameter is that will govern the selection of output event signals. Table 400 has one record 401 for each Step Type, specifying a Step Type ID 402, and a Type value 404 that indicates whether the control parameter is an output parameter generated by the application program, an input event field, or the input condition that resulted in instantiation of the step. Two other parameters 406 and 408 denote an output parameter ID, an input port and input event field, or an input condition ID, depending on the Type value 404.

Next the information obtained from the Output Condition Evaluation Table 400 is used to search the Value OutCondition Map Table 420 to select the output condition to be used. The Value OutCondition Map Table 420 contains one record 421 for each output condition associated with each Step Type. For a given Step Type, the Step Type ID 422 and Type value 424 in Table 420 are the same as in Table 400. Each record 421 for a given Step Type has a different Output Condition ID 426, with one such record 421 being selected by matching either the Input Condition ID field 428 with the step's instantiation input condition, or by matching the Value field 430 with the value of a specified output parameter or input event field. The end result of using tables 400 and 420 is the selection of an Output Condition ID.

The Output Condition Table 440 contains, for each distinct Output Condition ID of a given Step Type, one record 441 for each output port on which an output event signal is to be generated. Thus, each record 441 contains an Output Condition ID 442, a Step Type 444 and an Output Port ID 446. For instance, for a given Step Type, output ports Q1 and Q2 might be used when Output Condition OC1 is selected, while output ports Q2 and Q3 might be used when Output Condition OC2 is selected. In this example, there would be four Output Condition Table records 441 for this Step Type.

The purpose of the Output Data Mapping Table 460 is to specify the source of the information that is to be put in each data field of the output event signals. It should be noted that it is possible to have an event that has no data fields. Such event signals are useful because they indicate that a particular step of a long running transaction has been completed. In any case, Table 460 has one record 461 for each data field of each output event associated with the selected output condition. Each record 461 contains a condition ID 462 and Step Type ID 464 specifying the Step Type and output condition to which the record applies. The source of the data for one output event field is specified either by an input port ID 464 and input field ID 468 or by an output parameter ID (also stored in field 468), and the corresponding output event field is specified by an output port ID 470 and output field ID 472.

Note that once the selected output condition ID and the set of output port IDs is known, the Port Table 300 is used to look up the Event Type ID for each of the output event signals that needs to be generated, and then those Event Type IDs are used to look up in the Event Type Table 320 the data type and size of each data field in the output events to be generated.

Loop as Optional Output Condition

In some contexts a set of one or more steps may need to be repeated. In the example work flow 470 shown in FIG. 12, the role of step 472 is to review work performed by earlier steps 152-1 to 152-5 in the flow, and to decide whether the job is ready to progress to step 474 or, instead, should be sent back to step 476. For instance, the steps 476 and 152-1 to 152-5 shown in FIG. 12 might be tasks associated with repairing a particular type of machine, and step 472 might represent a quality review that is performed before passing the job onto some subsequent step (such as notifying the customer that the machine has been repaired).

Figure 12:
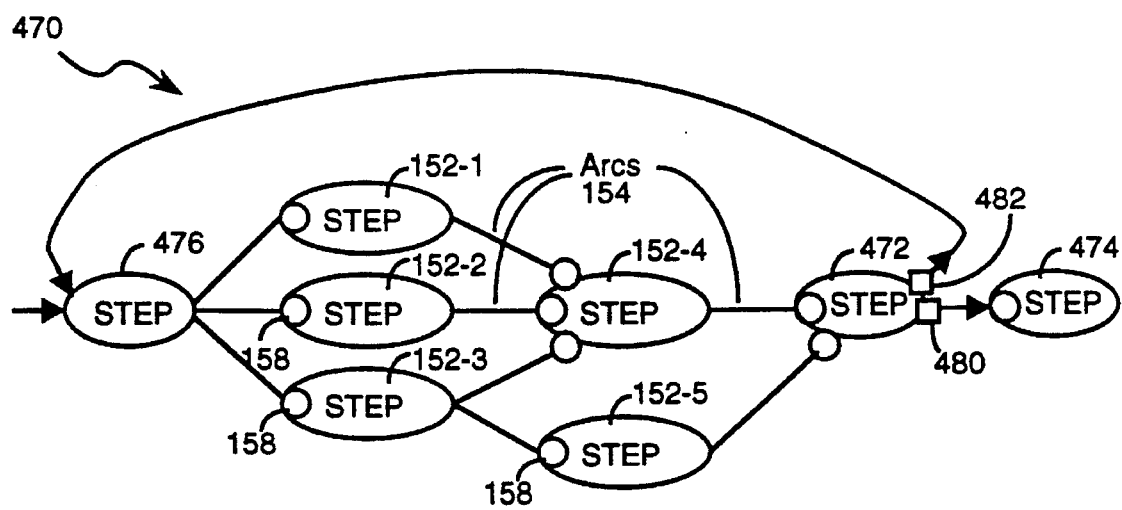
FIG. 12 schematically represents a flow in which a set of steps may be repeated.

The optional loop path shown in FIG. 12 is easily implemented using the output condition definitions described above. In particular, step 472 would be defined to have two output conditions, with the output condition being selected based on an output parameter generated by step 472. Thus, referring to FIG. 11, the record 401 in the Output Condition Evaluation Table 400 assiciated with step 472 would specify in field 404 that the type of evaluation parameter is an output parameter, and field 406 would specify the particular output parameter to be used (e.g., an output parameter called "Quality"). The Value OutCondition Map Table would have two records associated with step 472, for example, one record specifying that a value of Quality=1 is associated first a first Output Condition ID and a second record specifying that any other value of Quality is associated with a second Output Condition ID. The Output Condition Table 440 specifies the output port 480 or 482 to be used for each of these two Output Condition IDs. Finally, the Output Data Mapping Table 460 specifies the contents of each field in the two types of output event signals that can be generated.

Flow Controller

To summarize, the above description shows how a long term transaction can be broken down into component parts, herein called steps and arcs, and also shows how a complete description of the computations to be performed by the long term transaction and the data arcs between the steps can be stored in a set of database tables.

It should be understood that the data stored in the transaction description database 114 represents a set of "transaction types", each of which is essential a template that can be used an unlimited number of times. For instance, assume that one type of long running transaction is the automated assembly of an engine under the control of a computer or set of computers. The steps and flows associated with that transaction type would be stored in the transaction description database 114. Each time that the process of assembling an additional engine is started, a new instance of this transaction type will be created in the control computer. Thus, it is quite possible for dozens, hundreds or even thousands of instances of a particular transaction type to be executing, or at least be in process, simultaneously in a computer system.

More particularly, whenever a new transaction is started, one instance of the initial steps of the transaction are created and executed. Each step and flow downstream from the initial steps are created or instantiated only when a sufficient set of input event signals are present. Each instance of a flow is identified by a unique Flow Instance ID as well as its Flow Type ID. Each instance of a step is identified by a unique Step Instance ID as well as its Step Type ID.

The following is an explanation of how the actual execution of a long running transaction is handled.

Figure 13:
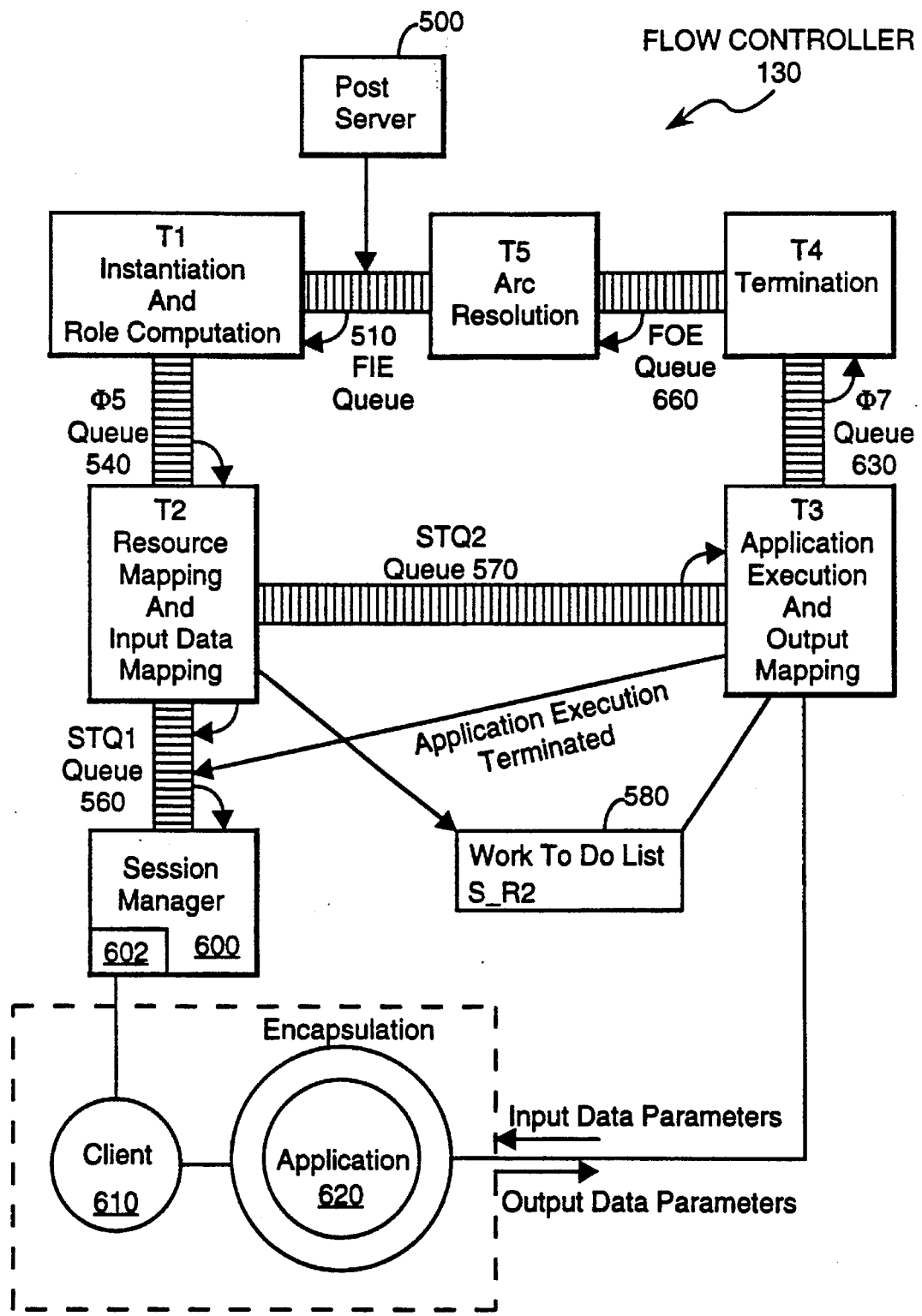
FIG. 13 is a block diagram of a flow management system, representing the processes and data structures used in the preferred embodiment to control instantiation and execution of the computational steps of a long running transaction.

FIG. 13 represents the components of the flow controller 130. The flow controller 130 uses five processes T1 through T5 to control the handling of each step in a long running transaction. Each of these processes has a corresponding input queue. FIGS. 14 through 19 show the data structures of these queues. The FIE queue stores input data events. Input data events include both event signals generated by previously executed steps and externally originated event signals. Externally originated event signals, typically representing a request to start a new long running transaction, are inserted into the FIE queue by a process called the Post Server 500.

An important aspect of the flow controller 130 is that the number of concurrently running processes associated with the flow controller 130 remains constant, regardless of the number of long running transactions that are executing at any one time. As will be explained below, each flow and step instance is assigned by the flow controller to a particular system resource (typically one of the system's processors) for execution. The flow controller's job is to coordinate the execution of transactions and the data flows therebetween, but the actual execution of each step is handled elsewhere. By using this division of work, the flow controller 130 is "scaleable" in that it is capable of handling a very wide range of work loads. To scale up a system to handle large numbers of transactions, the system manager needs only to increase the number of processors to which the flow controller can assign work. The number of computations or application programs simultaneously executing in the system on the system's various processors will depend on both the number of transactions currently executing and the amount of computing power available to service those transactions.

Figure 14:
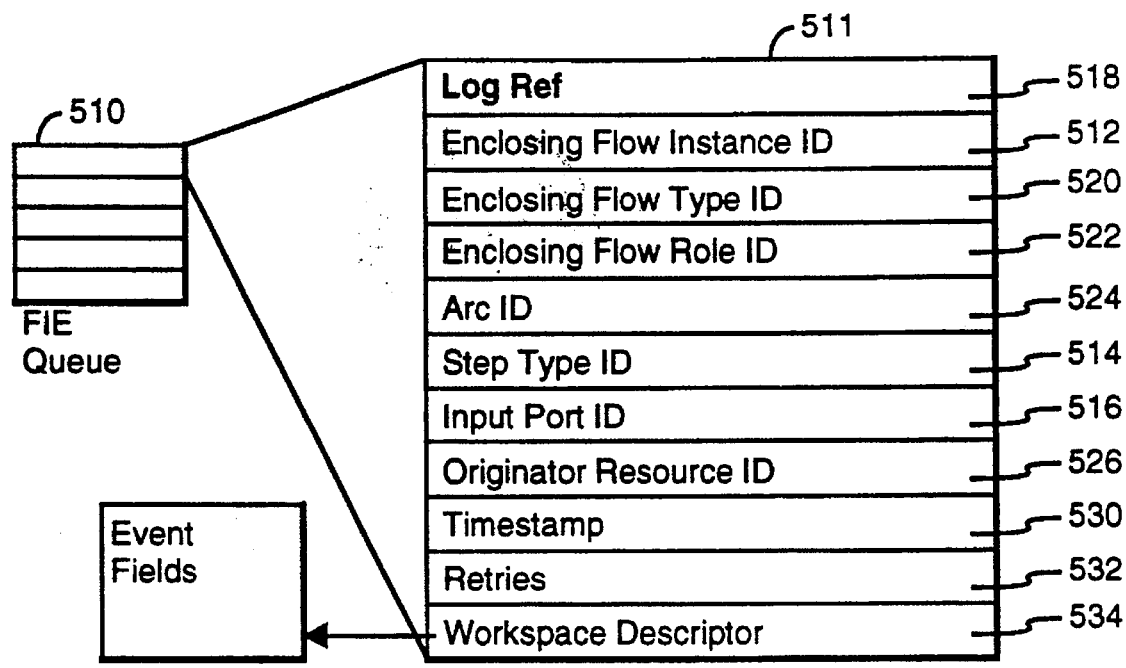
FIGS. 14, 15, 16, 17, 18 and 19 represent the data structures of queues used by the flow management system of FIG. 13 to represent input and output event signals and to represent steps in the process of being executed.

Process T1. Process T1 creates new instances of flows and steps whenever the event signals in the FIE queue 510 are sufficient to meet the input conditions specified for the corresponding Flow Type or Step Type. As discussed above with reference to FIGS. 7 and 8, whenever the event signals waiting in the FIE queue satisfies a Step Type's input condition, an instance of that Step Type is created. Referring to FIG. 14, each input event signal 511 in the FIE queue 510 specifies the enclosing Flow Instance 512 in which the arc for the signal is located, as well as the Step Type 514 and the Port ID 516 of that Step Type to which the input event signal is directed.

Other information in each input event signal 511 includes a Log Ref 518 field that is a pointer to a corresponding log record, the enclosing flow's Flow Type 520 and Flow Resource 522, and the Arc ID 524 of the arc that connects the step that generated the event signal and the step to which the event signal is being sent. Also in the event signal are Resource data 526 regarding the step that generated the event signal, a Timestamp 530 indicating when the event was generated, a Retries parameter 532 indicating the number of times the system has tried to convert an FOE record into the FIE record, and a Workspace Descriptor 532 that points to an area of memory in which all the data fields of the event signal are stored.

When the T1 process "creates an instance" of a step by assigning a new Step Instance ID and storing a new record 541 in the Φ5 queue 540. In essence, the new step instance exists at this point only as a new record 541 in the Φ5 queue 540.

Figure 15:
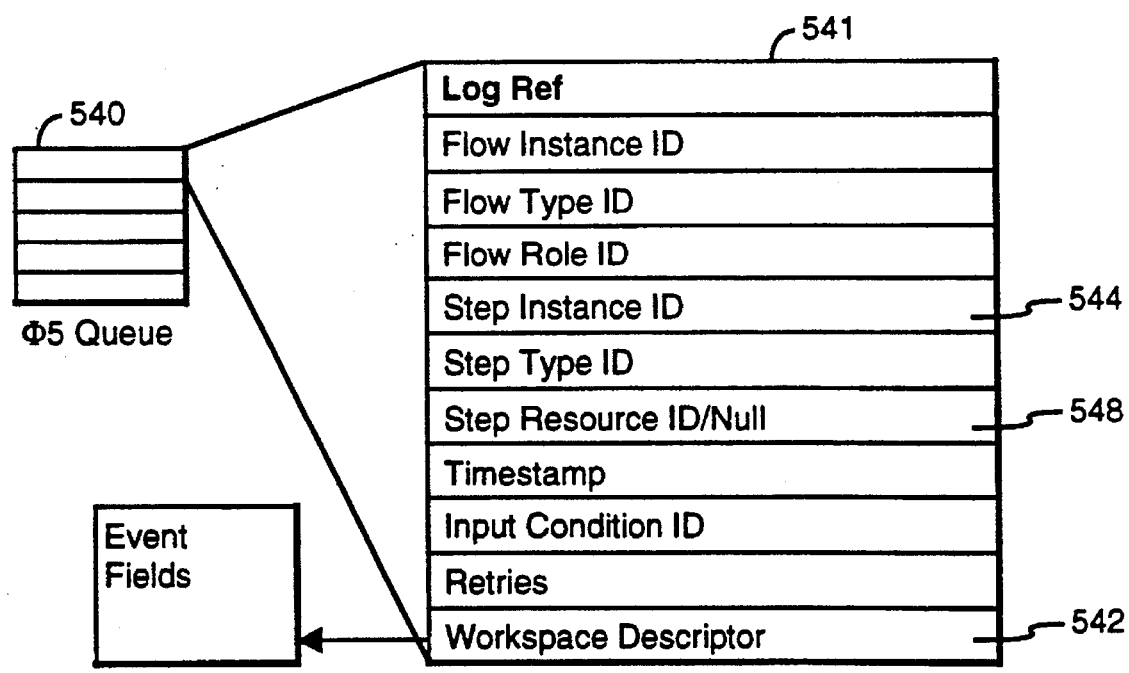

As shown in FIG. 15, several fields of the Φ5 queue records 541 are the same as in the FIE queue records. Note that the specified Flow Instance ID, Flow Type ID and Flow Resource ID correspond to the flow instance in which the created step instance is located. If the step instance is an input control step, the T1 process first allocates a new Flow Instance ID, and a corresponding log record, before generating the Φ5 queue records 541.

Since several event signals may be used to create one new step instance, the event data fields pointed to by workspace descriptor 542 in Φ5 queue record 541 may contain data from several input events. The new information in each Φ5 queue record 541 includes the Step Instance ID 544, and a Step Resource ID 548 that identifies the computer, machine or person to which execution of the step has been assigned. The Step Resource ID 548 is selected using the resource resolution function references by the Type Ref Table 220 (see FIG. 6) for the specified Step Type.

Process T2. Process T2 performs input data mapping and resource mapping. Neither input data mapping nor resource mapping is performed by input and output control steps.

Resource allocation is the process of determining the type or class of computer, machine or other principal that can execute a particular step or flow. Resource allocation is based on the resource resolution function ID for the step or flow, as specified in the Type Ref Table.

Figure 16:
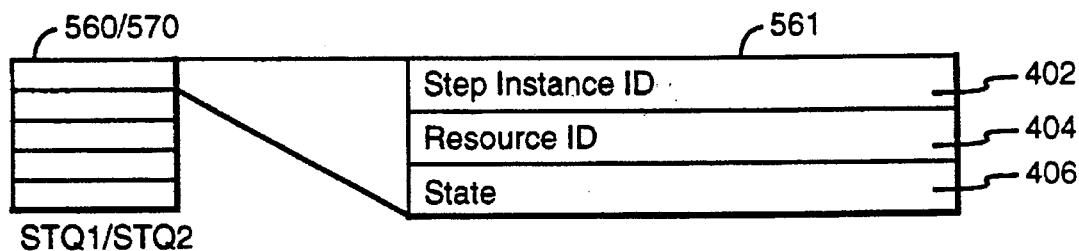

For both input and output control steps, the T2 puts a small record in the STQ2 570 queue indicating that the control step is ready for processing by the T3 process. The T2 process also adds a record for the control step to the S_R2 Work To Do List 580. The data structures of the records in the STQ1 and STQ2 queues 560 and 570 is shown in FIG. 16.

Figure 17:
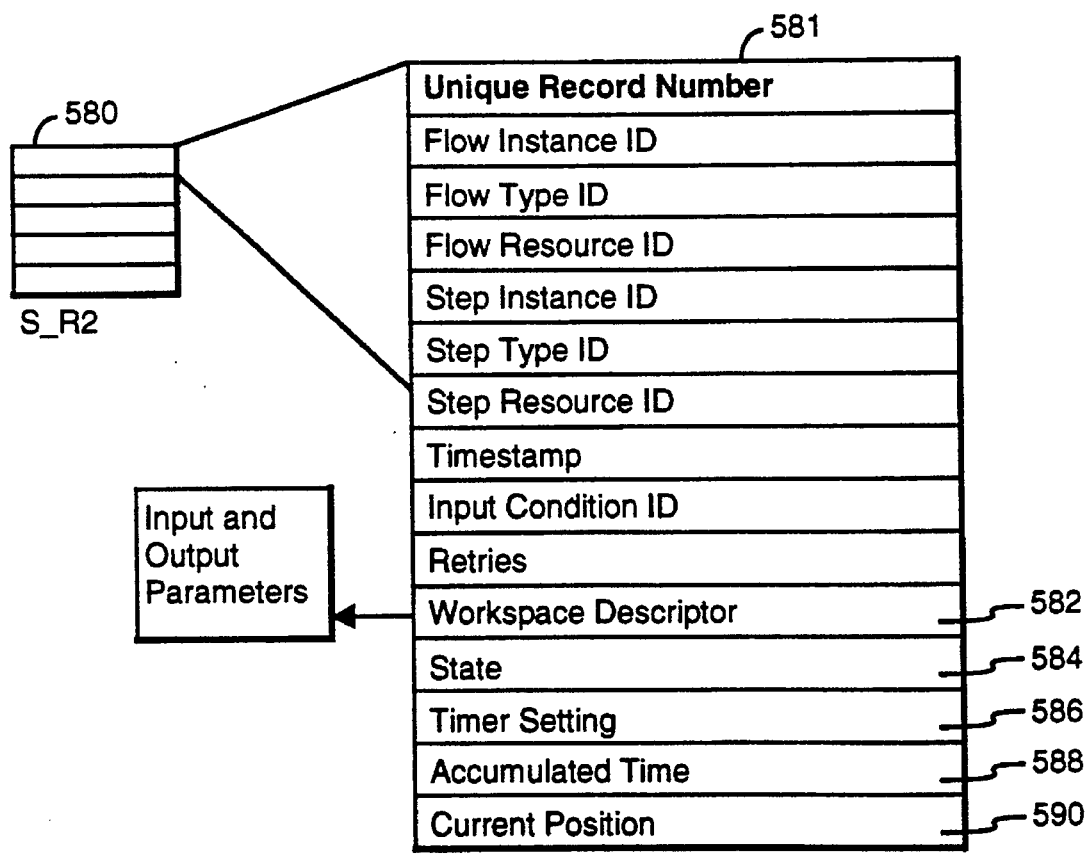

Output control steps require output data mapping, and the record added to the S_R2 list 580 for the control step notifies the T3 process that the control step is ready for processing. The data structure of records in the S_R2 list 580 are shown in FIG. 17. Note that the data structure of records in the S_R2 list are the same as the data structure for records in the Φ5 queue, with the addition of a State Field 584, Time Setting 586, Accumulated Time 588, and Current Position 590. The State Field 584 indicates the status of the step, such as "Waiting to Start", "Executing", or "Completed". When a step's S_R2 record indicates that its computation is completed, the process T3 takes over handling of that step. The Time Setting 584 is equal to the time at which the step will timeout if execution of the step is not yet complete, and is computed by the T2 process as the starting time for the step plus the Timeout Duration for the step.

For non-control steps, the T2 process performs input mapping and then puts a small record in the STQ1 queue 560 indicating that the step is ready for execution and processing by the T3 process. The T2 process also adds a record for each computational step to the S_R2 Work To Do List. The process for performing input data mapping was described above. The net result of the input data mapping process is a list of parameters sequenced in the order required for calling an application program. The mapped input data is stored in memory areas referenced by the Workspace Descriptor 582 of the S_R2 record.

A second function performed by the T2 process is monitoring timeout limits for each step and flow instance.

Session Manager, T3 Process and Application Execution. Referring to FIG. 13, the role of the session manager process 600 is to read items on the STQ1 queue 560, remove them from the queue 560 and add those items to a status list 602 stored internal to the session manager 600. Note that the items in the STQ1 queue 560 indicate the resource (i.e., computer) on which each step is to be executed. Client processes 610 running on various computers in the distributed computational system log onto the session manager 600 so as to obtain a list of all the items on the status list 602 that pertain to that client. When a client process 610 is ready to execute a new application program, it picks an item on list 602 (if there are any waiting for that process).

The client process then executes the application program 620 as follows. First the client calls the Application Manager process T3, passing it the Step Instance ID (obtained from the STQ1 queue record) for the step to be executed, and requests the process T3 to send it the list of input parameters for the application. The Application Manager process T3 finds the record in the S_R2 list 580 that corresponds to the specified Step Instance ID. Then it starts a "transaction" between the T3 process and the client 610 and sends the client the name of the application program to be run (obtained from the Step Type Table) and the input parameters for the application program (obtained from the record in the S_R2 list corresponding to the specified Step Instance ID). The client executes the application program and sends the resulting output parameters to the Application Manager process T3. Process T3 stores the output parameters in the workspace referenced by the Workspace Descriptor 582 in the S_R2 record for the step instance being executed and then terminates the transaction with the client process, durable storing the results of the computation.

At this point, the Application Manager process T3 adds a record to the STQ1 queue 560 indicating that the application program's execution has been completed. The Session Manager 602 uses this information to update its internal list 602, i.e., to delete the record concerning that step instance from its internal list 602.

Next, the Application Manager process T3 performs output mapping, mapping input and output parameters for the step into the fields of the output event signals. The output mapping process was explained above with reference to FIG. 10.

Output control steps, which are the last step at the end of each flow, also undergo output mapping. Each output control step is represented by a record in the STQ2 queue as well as an item in the S_R2 list. These records are picked up by the Application Manager process T3, and the input signals to the control step are mapped into output signals using the workspace descriptor from the corresponding S_R2 record to locate the input signal data.

Figure 18:
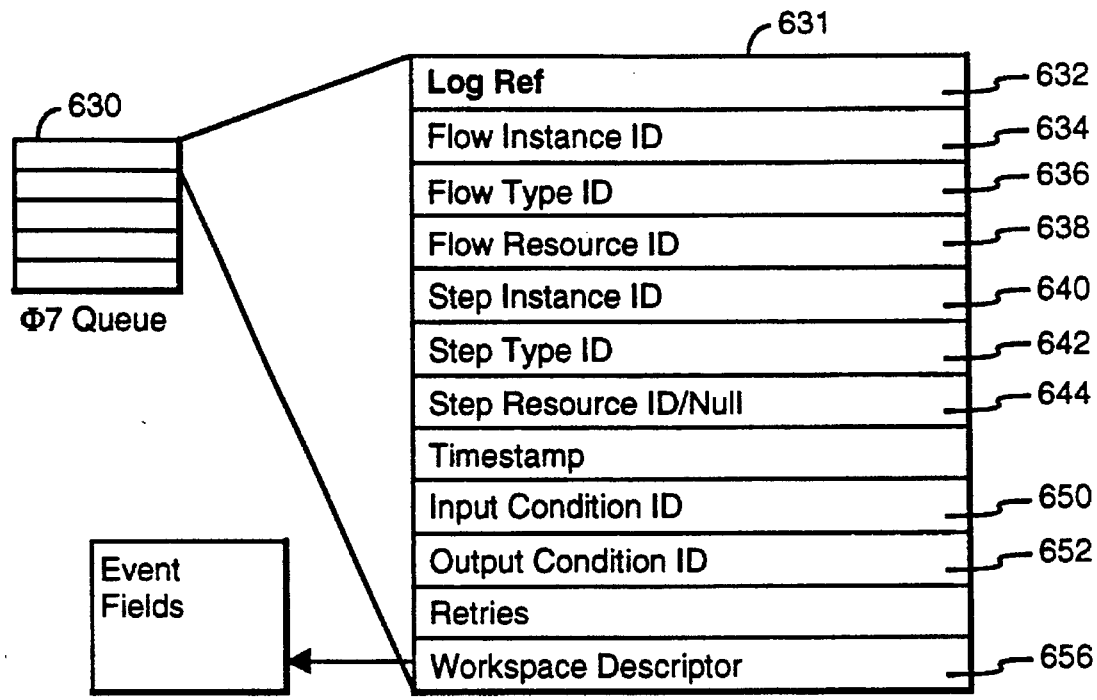

The Application Manager process T3 generates one record in the Φ7 queue 630 for executed step. The format of the Φ7 queue 630 is shown in FIG. 18. Each output event record has fields that identify the corresponding log record 632, flow instance 634–638 and step instance 640–644 that generated the output event, the input condition 650 that instantiated the step instance and the output condition 652 selected for output signal generation, plus a workspace descriptor 656 that points to an area of memory in which all the output event data fields associated with the step are stored.

Figure 19:
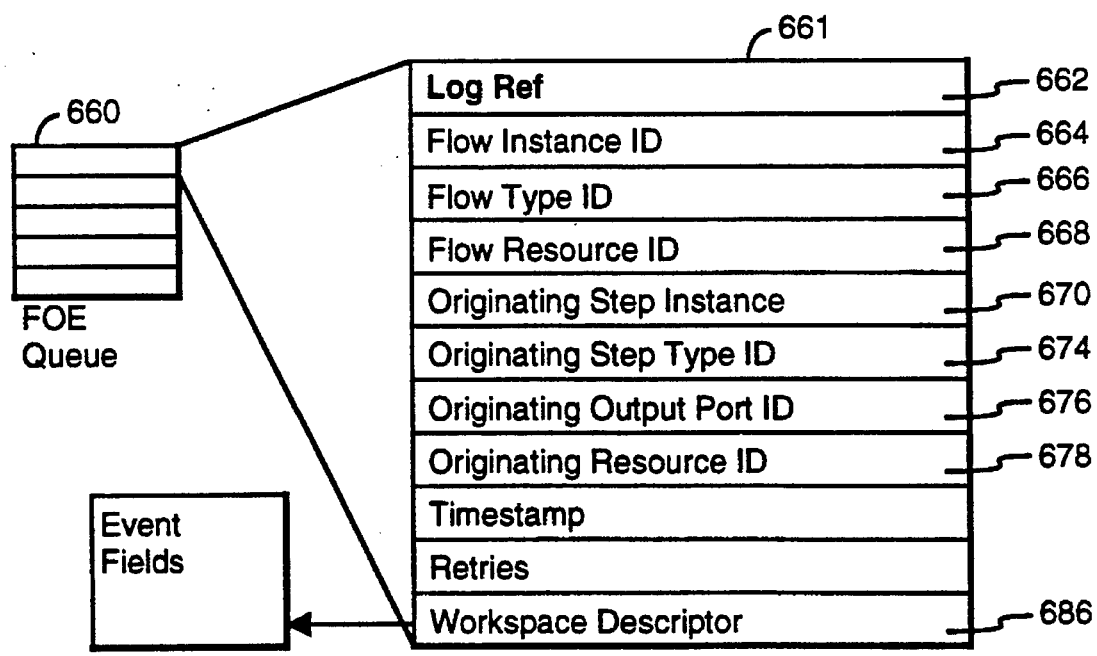

Next, the Step Termination Process T4 (see FIG. 13) generates a separate output event record in the FOE queue 660 for each output event signal. Step T4 also processes the log records for the step, which will be discussed below in the section of this document entitled "Log Record Database". The format of the FOE queue 660 is shown in FIG. 19. Each output event record has fields that identify the corresponding log record 662, flow instance 664–668 and originating step instance 670–678 that generated the output event, plus a workspace descriptor 686 that points to an area of memory in which the output event signal's data fields are stored.

Finally, the Arc Resolution process T5 looks at each record in the FOE queue 660, looks up the corresponding record in the Arc Table 250 (see FIG. 6), and then creates a corresponding FIE record in the FIE queue 510. The structure of the records in the FIE queue was discussed above with regard to FIG. 14. Note that for output control steps, whose output event signals will be sent to new flows that have not yet been generated, the T1 process generates a new Flow Instance ID to represent the new instance of the Flow Type specified in the Art Table 250.

Thus, we have now completed the entire cycle of processing the execution of a step. In a typical system, many steps from many different flows will be in process at the same time, and thus there can be many items in each of the queues at any one time waiting for processing. As each step works its way through the T1 to T5 loop, its records in the previous queue are deleted and new records are created in the next queue along the loop. Log records are generated by each of the processes T1 through T5 to allow recovery of steps interrupted by system failures. Log record generating and maintenance are discussed below.

It should be noted that the particular breakdown of operations between processes T1 through T5 represents only one possible embodiment of the invention. For instance, the T3 and T4 processes could easily be combined. However, the inventors found it desirable to close off and commit the computational step as quickly as possible. Therefore process T3 does as little work as possible to complete the computation and durably store its results, and then process T4 completes the process of generating output event signals.

Notification Steps

Referring to FIGS. 3 and 13, the steps 152 in a defined flow may include both automated steps, automatically performed by a computer or other machine, as well as "manual" steps that are performed by or under the control of a person or other independent principal (i.e., a principal that is autonomous from the viewpoint of the flow controller). From this perspective, the purpose of the present invention is to coordinate the activities performed by a multiplicity of principals working jointly on a defined project. Depending on the particular application of the invention, "principals" may include a number of human agents, each of whom need to perform various defined tasks before the project can progress to the next stage, and may also include a number of computers and machines that perform defined tasks once the defined project reaches a specified point.

The types of defined projects involving human principals are tremendously varied. Examples include the process of manufacturing a car engine or a watch, or even the process of preparing and assembling an edition of a newspaper. The flow specification indicates both the order in which tasks (i.e., steps) need to be performed, and also specifies the type of principal required to executed each step.

Note that each entry in the Type Ref Table (see FIG. 6) includes a Resource Resolution Function ID 236 that points, directly or indirectly, to a software routine that selects a "resource" (i.e., computer or other agent, such as a selected person) to execute the step. When the Resource Resolution Function is selecting a human principal to perform a step, the selection criteria will typically specify a job title indicating the required capabilities of the person to be selected, as well as other criteria such as the person's existing work lead or the person's relationship to the job being performed.

Referring to FIG. 13, the application program associated with "manual" steps to be performed by a human principal will typically have as its sole task sending notifications to a particular person, or to any available person who fits a specified "role" (e.g., a particular job title or description). Typically, the notification will state (A) that a particular job is ready to be worked on, and (B) that a particular command should be entered into the computer system when the person's work on the project is completed so that the project can progress to its next phase.

As discussed above, the T2 process sends a message to the session manager 600 via the STQ1 queue 560, regardless of whether the step is an automated computation or a manual step. The session manager 600 then posts the step in status list 602. Even manual steps to be performed by a human principal are nominally executed by a computer in that a selected computer processor is needed to execute the application program that notifies the human principal.

The notification step goes through the same basic steps as other steps during execution. Thus, it picks up input parameters via the T3 process. Input parameters for a notification step will include the information needed by the human principal to perform a particular step. That information may simply identify the task to be performed, or it may include things such as one or more associated files. Information may also be passed to a principal using mechanisms outside of the data flows associated with the arcs between steps. For instance, information related to a project may be stored in various files in secondary memory. When a notification message is sent to a human or even an automated principal working on the project, the notification message may simply indicate the name of the file rather than actually passing a copy of the file as an input parameter.

A similar indirect information passing mechanism can be used to communicate information between different work flow instances, which normally cannot communicate with one another, by including in each work flow a step that either reads or writes information in a predefined place (such as a disk file) that is accessable by the other.

For steps that may take a long time to be performed by a human principal, the application program 620 may actually consist of a number of programs. For instance, one program may send the notification, a second program may be used to send periodic follow up reminder messages to the human principal (sometimes called an agent), and a third program may be used by the human agent to indicate that the step has been completed. In this example, the third program notifies process T3 that the "application program" is done, and also passes to T3 a pointer to any outputs generated, after which T3 durably stores data representing the results of executing the step in the system's history database.

The application program in a notification step does not complete its execution until it receives a "task completed" command back from the principal to whom the notification is sent. In many instances, a file or other set of data will be conveyed by the principal who completes a particular step to the system for forwarding onto subsequent steps of the flow. For instance, if the human principal's job was to edit a newspaper article to fit a specified number of newspaper "column inches", the output from the application program associated with this step would be a file containing the edited newspaper article.

Alternately, the results of a step performed by a human principal can be conveyed using mechanisms outside the data flows associated with the flow controller by storing the results of the step in an file on disk for use by a subsequent step. In this scenario, the file can either be assigned a previously agreed upon file name, in which case the step produces no outputs other than an indication that it has been completed, or the file's name can be passed to subsequent steps as an output parameter in one or more output event signals.

Log Record Database and System Failure Recovery

An important aspect of all transaction processing systems is reliable recovery from system failures. For long running computations, recovery of intermediate results is important to avoid having to unnecessarily restart such computations at their very beginning.

Figure 20:
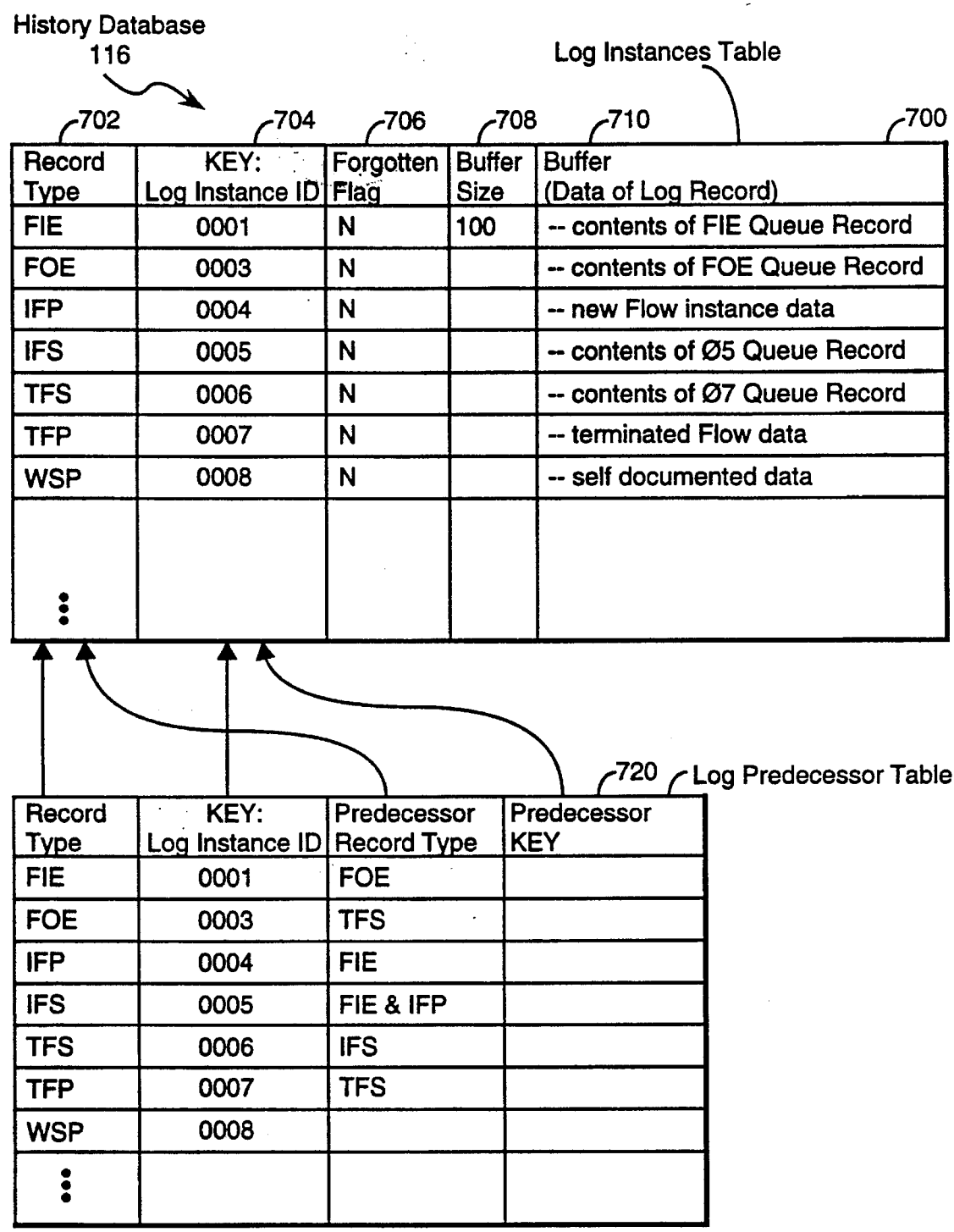
FIG. 20 depicts the structure of the history database used in the preferred embodiment.

Referring to FIG. 20, in the preferred embodiment, several types of log records are generated. The main types of log records are listed in FIG. 20. As can be seen, FIE, FOE, IFS (instantiate flow step) and TFS (terminate flow step)log records contain copies of records from the FIE, FOE, Φ5 and Φ7 queues. FIE log records are generated by the T5 Arc Resolution process and the Post Server, FOE records are generated by the T4 Termination process, IFS records are generated by the T1 Input Data Mapping process, and TFS records are generated by the T3 Application Manager process.

The IFP (instantiate flow process) and TFP (terminate flow process) log records are generated by the T1 and T4 processes, respectively. The WSP log records contain the data values referenced by the workspace descriptors in the various queue records. The WSP log records store this data in a self-documenting format so that the data type and associated event field for each datum is specified by the WSP log record. Furthermore, the FIE, FOE and other log records reference corresponding ones of the WSP log records by way of the workspace descriptor field at the end of those records, thereby providing access to the event field data values that are needed for recovering from a system failure.

There are no log records corresponding to the STQ1 queue, STQ2 queue and S_R2 work to do list. However, each of the STQ1 queue, STQ2 queue and S_R2 work to do list are independently durably stored so that these entire data structures can be reconstructed in the event of a system failure.

The structure of the History Database 116, also herein called the Log Record Database, includes two tables 700 and 720. The first table 700 contains the log records, each of which includes a "record type" field 702, indicating the type of the log record, a unique key value 704 to provide quick access to a specified log record (the key value need only be unique for its particular record type), a forgotten flag 706 that indicates whether the log record would be needed for system recovery, a buffer size value 708 indicating the total size of the log record, and a data buffer 710 in which all the data fields for the log record are stored.

The second table 720 is used to find the "predecessor" of each log record, which enables one to recreate the chain of events in the processing of a flow. Each record in this table 720 includes the same record type and key value as in the first table 700, plus the record type and key value of the log record's predecessor.

Figure 21:
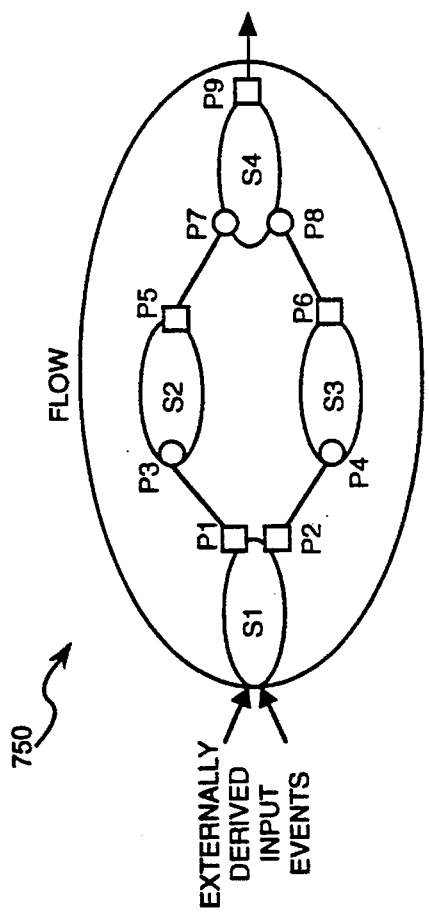
FIGS. 21 and 22 represent a computational flow and a corresponding set of log records stored in the history database in the preferred embodiment.
Figure 22:
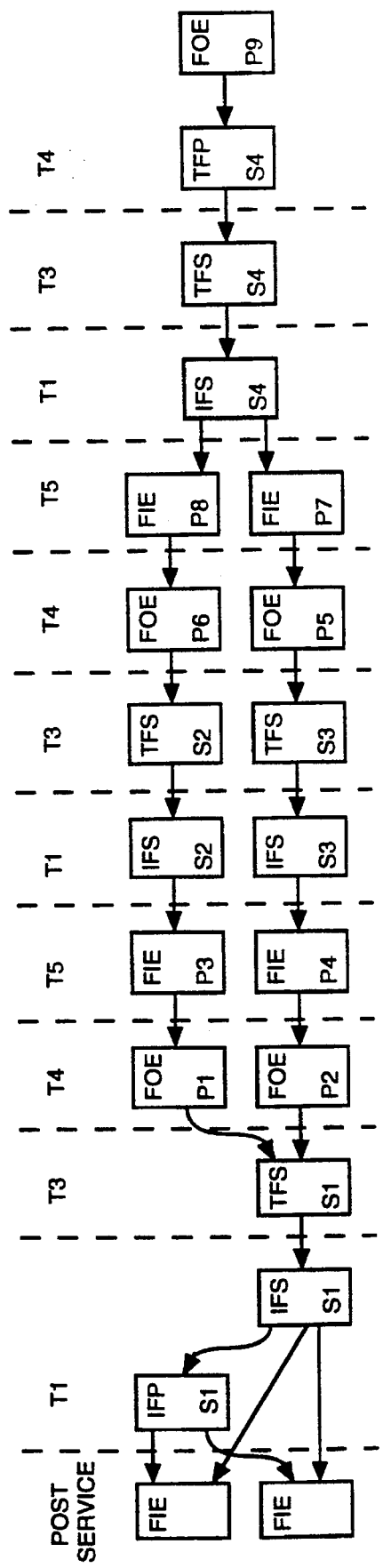

Referring to FIGS. 21 and 22, the concept of predecessor log records is explained by example. In FIG. 21 there is shown a flow with four steps S1, S2, S3, S4. The four steps have input and output ports, here labelled P1 through P9. The flow is initiated by receipt of two externally derived input event signals.

Referring to FIGS. 13, 21 and 22, to understand the set of log records generated during execution of the flow 750, it is helpful to look at the processing loop of FIG. 13. The time line in FIG. 22 goes from left to right, and the top row of FIG. 22 indicates the process that generates each log record. Each legend in each box indicates the record type of the log record generated, as well as the step or input/output port associated with the log record. The arrows pointing backwards in time indicate which log record is the predecessor of each other log record.

Starting at the left side of FIG. 22, the first two FIE log records reflect the externally derived input signals. Next, the T1 process instantiates the flow, creating an IFP log record and step S1 of the flow is also instantiated, creating an IFS log record. After executing step S1, the T3 process generates and TFS log record, and the T4 process generates two FOE log records corresponding to the output event signals generated for ports P1 and P2. This chain of events continues until completion of step S4 of the flow, with processes T1, T3, T4 and T5 generating log records along the way, each log record pointing to its predecessor in the computational process.

All the log records for all the ongoing long running transactions are durably stored, typically on disk storage devices, usually in a simple time sequential order. Whenever a flow is completed, the T4 process generates a terminal flow (TFP) log record as well as an FOE log record for each output event signal. Then the T4 process marks all the log records for the flow that are now unnecessary for system recovery as "forgotten" using the Forgotten Flag field of the log records shown in FIG. 20. In particular, only the IFP, TFP log records, and the FOE log records for output events output by the flow need to be retained for system recovery purposes. Tracing through all the log records for a completed flow is accomplished using the predecessor pointers provided by the second history database table 720.

In the event of a system failure, the log records in the history database are inspected so as to regenerate all the items that belong in the FIE, FOE, $\Phi5$, and $\Phi7$ queues. This is done by reviewing the log records for each long running computation, finding the point at which each flow and step was interrupted by the system failure, regenerating the corresponding queue records from the data in the log records, and the restarting the T1 through T5 processes.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a distributed computer system having a plurality of interconnected computers, a long running transaction management apparatus comprising:

A) flow description means for storing flow description data representing each of a number of types of long running transactions as a flow comprising a set of steps with arcs therebetween, each said step comprising a respective computer-executable application routine and each said arc comprising a respective data signal path, said flow description data specifying input condition criteria for starting execution of each said step upon occurrence of a specified number of specified input events and resource selecting criteria for selecting a resource to execute each said step, said flow description data thereby providing a respective template corresponding to each said transaction type;

B) a flow controller coupled to said flow description means for creating and executing a number of instances of transactions corresponding to said transaction types in accordance with the corresponding templates stored in said flow description means, said flow controller operable (i) to select dynamically a respective resource for performing the execution of said step in accordance with the resource selecting criteria stored in said flow description means, said flow controller selecting said resource after executing any and all steps of said transaction instance that said flow description data indicates as being prior to said step, and (ii) to initiate execution of each step in each of said instances of said transactions when said input condition criteria for said step as stored in said flow description means are satisfied; and C) means for durably storing status information and a number of results from each said executed step for use by said flow controller in tracking execution and in recovery following interruptions in execution of instances of said long running transactions, whereby said flow controller can cause reinitiation of execution following any interruption of the execution of said instances of said long-running transactions.

2. The long running transaction management system of claim 1, wherein said flow description means further includes (including) output event table means for defining a number of output event signals generated by each step of each long running transaction, port table means for defining a number of input ports for each step of each long running transaction, and arc table means for storing data denoting for each defined output event signal a destination step and said destination step's input port to which said output event signal should be sent;

said flow controller means further includes (A) step termination means for receiving a number of output parameters generated by executed steps of said created instances of said long running transactions and generating a set of corresponding output event signals in accordance with said output event table means, and (B) arc resolution means for routing said output event signals to input ports of corresponding steps of said created instances of long running transactions in accordance with said arc table means.

3. The long running transaction management system of claim 1, wherein said flow controller means further includes means for generating durable log records corresponding to (A) each created instance of one of said long running transactions, (B) termination of execution of each created instance of one of said long running transactions, (C) each said step in one of said long running transactions for which execution has been initiated, and (D) termination of each step in one of said long running transactions for which execution has been initiated; and said system further includes transaction restarting means for restarting long running transactions interrupted by a system failure by reviewing said durable log records and restarting execution of said interrupted long running transactions so as to avoid reexecuting steps thereof that have already been terminated.

4. The long running transaction management system of claim 1, wherein said flow description means further includes output event definition means for defining for any specified one of said steps (A) a number of output conditions, (B) criteria for selecting a first of said output conditions after executing said step, (C) a number of event signals, associated with each defined output condition, to be generated after executing said step, including a specification of parameters to be included in each said event signal, and (D) data denoting for each defined output event signal a destination step to which said output event signal is to be sent;

said flow controller means further includes means for (A) evaluating said criteria for selecting said first of said output conditions after executing each said step, (B) generating a number of said event signals associated with said selected first output condition after executing said step, and (C) sending said generated output event signals to the corresponding destination step defined by said flow description means;

whereby specified ones of said steps can send different output event signals to different destination steps in accordance with defined criteria that are evaluated after execution of said specified ones of said steps.

5. The long running transaction management system of claim 1, further including a plurality of resource resolution functions, each resource resolution function defining criteria for selecting a resource to execute a specified step when said specified step is instantiated;

wherein said flow description means further includes means for associating with each one of said defined steps one of said resource resolution functions; and wherein said flow controller means further includes means for executing, each time that a step is instantiated, the resource resolution function associated with said instantiated step and thereby selecting a resource for executing said instantiated step.

6. The long running transaction management system of claim 5, wherein said flow controller means further includes a plurality of concurrently executing processes for instantiating said steps of said created instances of long running transactions, for selecting a resource to execute each instantiated step, for receiving output event signals generated by executed steps, and for sending said output event signals to other steps of said created instances of long running transactions; wherein the number of said plurality of concurrently executing processes in said flow controller means remains constant regardless of the number of instantiated steps extant in the system.

7. The long running transaction management system of claim 1, wherein said flow controller performs a plurality of separate, durably stored, sub-transactions for: (A) instantiating each step of said created instances of long running transactions, (B) after execution of each step by a selected resource, receiving output event signals from said resource, and (C) mapping said received output event signals into input event signals for other steps.

8. The long running transaction management system of claim 1, further comprising:

history management means including means for storing and retrieving status data concerning said created instances of said ones of said long running transactions during execution thereof, wherein said status data includes status information for each said step of said created instances of said ones of said long running transactions;

whereby long running transactions are executed in units of steps, and each long running transaction's status is tracked by storage of status data concerning execution of the steps associated with said each long running transaction.

9. In a distributed computer system having a plurality of interconnected computers, a method for managing long running transactions comprising the steps of:

A) storing flow description data, said flow description data representing each of a number of types of long running transactions as a respective flow, each said flow comprising a set of steps with arcs therebetween, each said step comprising a computer-executable application routine and each said arc comprising a data signal path, said flow description data specifying input condition criteria for starting execution of each said step upon occurrence of a specified number of specified input events and resource selecting criteria for selecting a resource to execute each said step, said flow description data thereby providing a template corresponding to each said transaction type;

B) creating and executing a number of instances of transactions corresponding to said transaction types, said executing step being performed in accordance with said stored templates and including, for each said step of each said transaction instance, the steps of (i) dynamically selecting a resource for performing execution of said step in accordance with the stored resource selecting criteria, said selecting step being performed after executing any and all steps of said transaction instance that said flow description data indicates as being prior to said step, and (ii) initiating execution of said step when said stored input condition criteria for said step are satisfied;

C) durably storing status information and results from each said executed step for use in tracking execution of said transaction instances and in recovery following interruptions in execution of transaction instances; and D) using said stored status information for reinitiation of execution following any interruption of the execution of transaction instances.

10. The method of performing long running transactions of claim 9, further comprising the steps of generating durable log records corresponding to (A) each created instance of one of said long running transactions, (B) termination of execution of each created instance of one of said multiplicity of long running transactions, (C) each said step in one of said long running transactions for which execution has been initiated, and (D) termination of each said step in one of said multiplicity of long running transactions for which execution has been initiated; and restarting ones of said long running transactions interrupted by a system failure by reviewing said durable log records and restarting execution of said interrupted long running transactions so as to avoid reexecuting steps thereof that have already been terminated.

11. The method of performing long running transactions of claim 9, wherein said flow description data includes output event data defining for any specified one of said steps (A) a plurality of output conditions, (B) criteria for selecting a first of said output conditions after executing said step, (C) a number of event signals, associated with each defined output condition, to be generated after executing said step, including a specification of parameters to be included in each said event signal, and (D) data denoting for each defined output event signal a destination step to which said output event signal is to be sent;

said method further comprises the steps of (A) evaluating said criteria for selecting said first of said output conditions after executing each said step, (B) generating a number of said event signals associated with said selected first output condition after executing said step, and (C) sending said generated output event signals to the corresponding destination step defined by said flow description data;

whereby specified ones of said steps can send different output event signals to different destination steps in accordance with defined criteria that are evaluated after execution of said specified ones of said steps.

12. The method of performing long running transactions of claim 9, wherein said system further includes a plurality of resource resolution functions, each resource resolution function defining criteria for selecting a resource to execute a specified step when said specified step is instantiated;

said flow description data includes data associating with each one of said defined steps one of said resource resolution functions;

said method further comprises the step of executing, each time that a step is instantiated, the resource resolution function associated with said instantiated step and thereby selecting a resource for executing said instantiated step.

13. The method of performing long running transactions of claim 12, further comprising the step of concurrently executing processes for instantiating said steps of said created instances of long running transactions, for selecting a resource to execute each instantiated step, for receiving output event signals generated by executed steps, and for sending said output event signals to other steps of said created instances of long running transactions; wherein the number of said plurality of concurrently executing processes remains constant regardless of the number of instantiated steps extant in the system.

14. The method of performing long running transactions of claim 9, further comprising the step of performing a plurality of separate, durably stored, sub-transactions for: (A) instantiating each step of said instances of long running transactions, (B) after execution of each step by a selected resource, receiving a number of output event signals from said resource, and (C) mapping said received output event signals into input event signals for other steps.

15. The method of performing long running transactions of claim 9, wherein said flow description data includes output event data defining a number of output event signals generated by each step of each long running transaction, port data for defining a number of input ports for each step of each long running transaction, and arc data denoting for each defined output event signal a destination step and said destination step's input port to which said output event signal should be sent;

said method further comprises the steps of (A) receiving a number of output parameters generated by executed steps of said created instances of said long running transactions and generating a set of corresponding output event signals in accordance with said output event data, and (B) routing said output event signals to input ports of corresponding steps of said created instances of said long running transactions in accordance with said arc data.

\* \* \* \* \*